Nov. 27, 1923.  1,475,654
P. J. SHEA
LEVER HANDLE FOR LAVATORY FAUCETS AND THE LIKE
Filed March 16, 1923
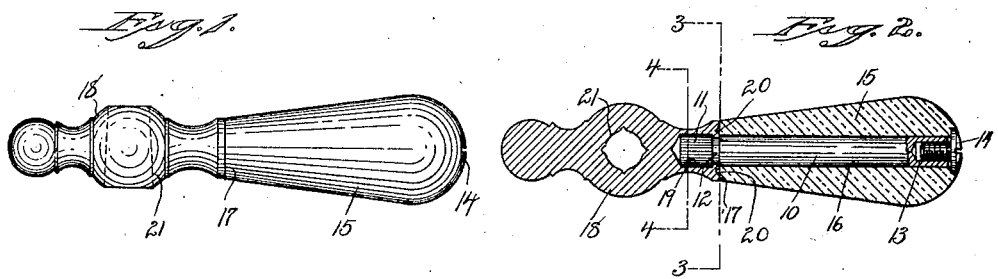
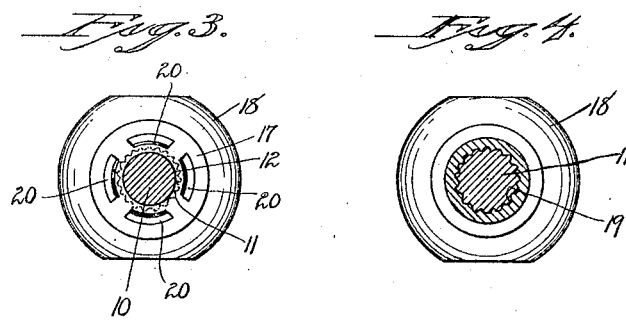
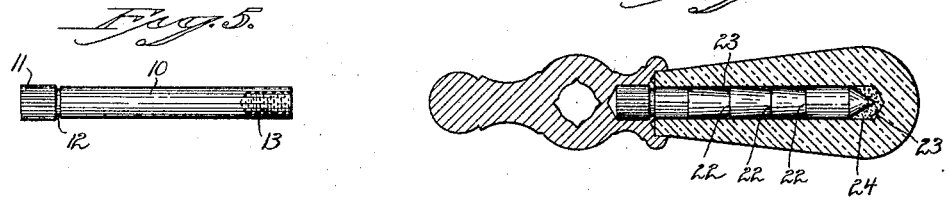

Patented Nov. 27, 1923.

1,475,654

UNITED STATES PATENT OFFICE.

PATRICK J. SHEA, OF WATERBURY, CONNECTICUT, ASSIGNOR TO CHASE COMPANIES, INC., OF WATERBURY, CONNECTICUT, A CORPORATION.

LEVER HANDLE FOR LAVATORY FAUCETS AND THE LIKE.

Application filed March 16, 1923. Serial No. 625,477.

*To all whom it may concern:*

Be it known that I, PATRICK J. SHEA, a citizen of the United States, residing at Waterbury, in the county of New Haven and State of Connecticut, have invented a new and useful Improvement in Lever Handles for Lavatory Faucets and the like; and I do hereby declare the following, when taken in connection with the accompanying drawings and the characters of reference marked thereon, to be a full, clear, and exact description of the same, and which said drawings constitute part of this application, and represent, in—

Fig. 1 a view in side elevation of a lever-handle constructed in accordance with my invention.

Fig. 2 a view thereof in longitudinal section on the line 2—2 of Fig. 1.

Fig. 3 a view on an enlarged scale on the line 3—3 of Fig. 2.

Fig 4 a similar view on the line 4—4 of Fig. 2.

Fig. 5 a detached plan view of the stem for mounting the vitreous handle-grip.

Fig. 6 a view corresponding to Fig. 3, showing a modified form of mounting-stem.

My invention relates to an improvement in that class of lever-handles for lavatory faucets and the like which are provided with sanitary grips, made of china, glass or other vitreous or equivalent material, the object being to reduce the expense of this feature of lavatory trimmings.

With these ends in view, my invention consists in a lever lavatory handle having certain details of construction and combinations of parts as will be hereinafter described and particularly recited in the claims.

In carrying out my invention, as shown in Figs. 1 to 5 inclusive, I employ a mounting-stem 10 having its inner end provided with a cylindrical head 11 having longitudinal corrugations and separated from the adjacent end of the stem by an annular anchoring-groove 12. The outer end of the said stem is formed with a threaded bore 13 for the reception of a retaining-screw 14, by means of which a handle-grip 15 of china, glass or other vitreous material is secured upon the stem. A longitudinal passage 16 in the said grip adapts it to be slipped over the stem, its inner end being brought to a bearing upon a circular face 17 formed at one end of the metal handle-body 18. A bore 19, entering the said face 17 and concentric therewith, receives the head 11 of the stem 10, being slightly smaller in diameter than the diameter thereof, so that, when the said head is driven into the said bore with a tight fit, the stem is firmly held against rotation. To prevent the stem from being pulled out of the said bore, and so away from the handle-body, the metal of the face 17 is upset at a point close to the bore 19, so as to crowd enough metal into the anchoring-groove 12 of the stem to positively couple the handle-body and stem together. As shown in Fig. 3, four segmental indentations 20 are formed in the face 17 for the purpose just indicated, but I do not limit myself to indenting the face 17 in any particular way to secure this result. The handle-body is furnished, as usual, with a tapering hole 21 for the reception of the upper end of the valve-stem, which is not shown.

In the modified construction shown by Fig. 6 of the drawings, the mounting-stem, instead of being provided at its outer end with a threaded bore for the reception of a screw for retaining the handle-grip, is turned to form a series of retaining-shoulders 22, which are engaged by a filling 23 of cement in a deep bore 24 entering the inner end of the grip, but not extending clear through the same.

I claim:

1. In a lever-handle for lavatory faucets and the like, the combination with a handle-body formed at one end with a bore, of a handle-stem provided with a roughened head driven into the said bore, and with an anchoring-groove into which portions of the metal of the body are upset, and a handle-grip mounted upon the stem.

2. In a lever-handle for lavatory faucets and the like, the combination with a handle-body provided at one end with a bore, of a handle-stem having at its inner end a corrugated head driven into the said bore, and with an annular retaining-groove located adjacent to the said head, and receiving portions of the handle-body which are upset into it, and a handle-grip mounted upon the said stem.

In testimony whereof, I have signed this specification in the presence of two subscribing witnesses.

PATRICK J. SHEA.

Witnesses:
 JOHN S. NEAGLE,
 A. C. RECKER.